(12) United States Patent
Chen et al.

(10) Patent No.: US 11,178,242 B2
(45) Date of Patent: Nov. 16, 2021

(54) METHOD AND SYSTEM FOR OBTAINING USER'S VISIT INFORMATION, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Zhuo Chen, Beijing (CN); Mingyu Wu, Beijing (CN); Minghao Wu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 80 days.

(21) Appl. No.: 16/301,434

(22) PCT Filed: Aug. 10, 2016

(86) PCT No.: PCT/CN2016/094334
§ 371 (c)(1),
(2) Date: Nov. 13, 2018

(87) PCT Pub. No.: WO2017/193493
PCT Pub. Date: Nov. 16, 2017

(65) Prior Publication Data
US 2019/0297157 A1 Sep. 26, 2019

(30) Foreign Application Priority Data
May 11, 2016 (CN) .......................... 201610308019.1

(51) Int. Cl.
G06F 15/173 (2006.01)
H04L 29/08 (2006.01)
(Continued)

(52) U.S. Cl.
CPC .............. *H04L 67/24* (2013.01); *H04L 67/18* (2013.01); *H04W 4/023* (2013.01); *H04W 8/005* (2013.01); *H04W 8/22* (2013.01); *H04W 64/00* (2013.01)

(58) Field of Classification Search
CPC ........ H04L 67/24; H04L 67/18; H04W 4/023; H04W 8/005; H04W 8/22; H04W 64/00
(Continued)

(56) References Cited

U.S. PATENT DOCUMENTS 8,433,399 B1 * 4/2013 Nosrati .................. A61B 5/332
600/523
9,036,509 B1 * 5/2015 Addepalli ............... H04W 4/40
370/259
(Continued)

FOREIGN PATENT DOCUMENTS

| CN | 102497667 A | 6/2012 |
| CN | 103391327 A | 11/2013 |
(Continued)

OTHER PUBLICATIONS

International Search Report for PCT/CN2016/094334 dated Dec. 30, 2016 and its English translation provided by WIPO.
(Continued)

*Primary Examiner* — Thu Ha T Nguyen
(74) *Attorney, Agent, or Firm* — Ladas & Parry, LLP

(57) ABSTRACT

The present disclosure provides a method and system for obtaining a user's visit information, a device and a computer storage medium, wherein the method comprises: a monitoring device which is arranged within a coverage range of a wireless router monitors a wifi broadcast message; cracking the monitored wifi broadcast message to obtain a user terminal equipment identification and/or a user identification contained in the message; and uploading the user terminal
(Continued)

equipment identification and/or the user identification to a service-end device, so that the service-end device stores a correspondence relationship between the user identification and address information of the monitoring device. In this manner, the user's visit information can be collected without the user's extra behaviors, and dependence on the user behaviors is weakened.

17 Claims, 4 Drawing Sheets

(51) Int. Cl.
*H04W 4/02* (2018.01)
*H04W 8/00* (2009.01)
*H04W 8/22* (2009.01)
*H04W 64/00* (2009.01)

(58) Field of Classification Search
USPC .................................. 709/203, 223, 224
See application file for complete search history.

(56) References Cited

U.S. PATENT DOCUMENTS

| | | | | |
|---|---|---|---|---|
| 9,135,612 | B1* | 9/2015 | Proctor, Jr. | G06Q 30/0266 |
| 9,769,862 | B2* | 9/2017 | Sheng | H04W 76/14 |
| 9,775,126 | B2* | 9/2017 | Skaaksrud | G06Q 10/0833 |
| 10,251,128 | B2* | 4/2019 | Nguyen | H04W 4/14 |
| 10,547,967 | B2* | 1/2020 | Liao | G08G 1/005 |
| 10,771,951 | B2* | 9/2020 | Mehta | H04W 4/90 |
| 10,986,622 | B2* | 4/2021 | Zhang | H04B 7/088 |
| 2004/0127180 | A1* | 7/2004 | Burke | H04B 1/16 455/161.3 |
| 2005/0102703 | A1* | 5/2005 | Querashi | H04N 21/234336 725/117 |
| 2006/0217130 | A1* | 9/2006 | Rowitch | G01S 19/252 455/456.1 |
| 2006/0291420 | A1* | 12/2006 | Ng | H04W 36/10 370/331 |
| 2007/0087756 | A1* | 4/2007 | Hoffberg | G06Q 30/0201 455/450 |
| 2007/0184836 | A1* | 8/2007 | He | H04W 52/0245 455/434 |
| 2007/0255111 | A1* | 11/2007 | Baldus | C09K 11/7734 600/300 |
| 2008/0139203 | A1* | 6/2008 | Ng | H04L 67/146 455/436 |
| 2008/0285500 | A1* | 11/2008 | Zhang | H04B 7/15507 370/315 |
| 2009/0233622 | A1* | 9/2009 | Johnson | H04W 4/24 455/456.3 |
| 2009/0233623 | A1* | 9/2009 | Johnson | H04W 4/025 455/456.3 |
| 2010/0069035 | A1* | 3/2010 | Johnson | G06Q 30/0633 455/404.1 |
| 2010/0120398 | A1* | 5/2010 | Chang | H04W 48/08 455/411 |
| 2010/0304706 | A1* | 12/2010 | Haverty | H04K 3/45 455/404.1 |
| 2011/0019824 | A1* | 1/2011 | Sattiraju | H04W 12/033 380/270 |
| 2012/0143383 | A1* | 6/2012 | Cooperrider | H02J 13/0079 700/295 |
| 2012/0149309 | A1* | 6/2012 | Hubner | H04W 4/023 455/67.11 |
| 2012/0190386 | A1* | 7/2012 | Anderson | G01C 15/04 455/456.3 |
| 2012/0243474 | A1* | 9/2012 | Iyer | H04L 63/1466 370/328 |
| 2013/0285855 | A1* | 10/2013 | Dupray | G01S 19/48 342/451 |
| 2013/0337789 | A1* | 12/2013 | Johnson | H04W 64/00 455/414.1 |
| 2014/0009292 | A1* | 1/2014 | Long | G08B 21/245 340/573.1 |
| 2014/0056220 | A1* | 2/2014 | Poitau | H04L 67/16 370/328 |
| 2014/0269269 | A1* | 9/2014 | Kovvali | H04W 24/08 370/229 |
| 2014/0280901 | A1* | 9/2014 | Balachandran | H04W 24/04 709/224 |
| 2014/0355592 | A1 | 12/2014 | Camps et al. | |
| 2015/0094096 | A1* | 4/2015 | Tang | H04W 4/022 455/456.3 |
| 2015/0341939 | A1* | 11/2015 | Sharma | H04W 52/243 370/329 |
| 2016/0070287 | A1* | 3/2016 | Chin | G05F 1/66 700/297 |
| 2016/0143075 | A1* | 5/2016 | Tucker | H04W 76/45 370/329 |
| 2016/0150419 | A1* | 5/2016 | Thangarasa | H04W 24/02 370/254 |
| 2016/0173239 | A1* | 6/2016 | Kim | H04L 1/1812 370/329 |
| 2016/0226732 | A1* | 8/2016 | Kim | H04W 12/04031 |
| 2016/0262130 | A1* | 9/2016 | Johansson | H04W 68/02 |
| 2016/0330676 | A1* | 11/2016 | Thangarasa | H04W 76/14 |
| 2017/0019165 | A1* | 1/2017 | Ramasamy Chinannan | H04L 69/22 |
| 2017/0213178 | A1* | 7/2017 | Todd | H04L 12/4625 |
| 2017/0251347 | A1* | 8/2017 | Mehta | H04W 4/08 |
| 2017/0278061 | A1* | 9/2017 | Skaaksrud | H04L 67/12 |
| 2018/0034913 | A1* | 2/2018 | Matthieu | H04W 12/0609 |
| 2018/0041934 | A1* | 2/2018 | Agarwal | H04L 65/608 |
| 2018/0054695 | A1* | 2/2018 | Castor | H04W 4/80 |
| 2018/0102961 | A1* | 4/2018 | Emmanuel | H04W 36/0083 |
| 2018/0247544 | A1* | 8/2018 | Mustafic | G08G 5/0039 |
| 2018/0260807 | A1* | 9/2018 | Yang | G07F 9/002 |
| 2019/0053003 | A1* | 2/2019 | Cheung | H04W 4/30 |
| 2019/0258805 | A1* | 8/2019 | Elovici | G06F 21/577 |
| 2019/0289648 | A1* | 9/2019 | Kim | H04L 41/0803 |
| 2019/0297157 | A1* | 9/2019 | Chen | H04W 8/22 |
| 2020/0021451 | A1* | 1/2020 | Pinheiro | H04W 88/04 |
| 2020/0094091 | A1* | 3/2020 | Skaaksrud | B60Q 9/00 |
| 2020/0105254 | A1* | 4/2020 | Sarir | H04L 67/26 |
| 2020/0225655 | A1* | 7/2020 | Cella | G05B 23/0264 |
| 2020/0226912 | A1* | 7/2020 | Wright | G08B 7/06 |
| 2020/0229069 | A1* | 7/2020 | Chun | H04W 36/0079 |

FOREIGN PATENT DOCUMENTS

| | | |
|---|---|---|
| CN | 103426209 A | 12/2013 |
| CN | 103716777 A | 4/2014 |
| CN | 103886648 A | 6/2014 |
| CN | 105163278 A | 12/2015 |
| CN | 105407155 A | 3/2016 |
| CN | 105551103 A | 5/2016 |

OTHER PUBLICATIONS

Written Opinion of the International Search Authority PCT/CN2016/094334 dated Dec. 30, 2016 and its English translation provided by WIPO.
First Office Action and Search Report from CN app. No. 201610308019.1, dated Jan. 6, 2017, with English translation provided by Global Dossier.
Second Office Action from CN app. No. 201610308019.1, dated Apr. 26, 2017, with English translation provided by Global Dossier.
Third Office Action from CN app. No. 201610308019.1, dated Aug. 16, 2017, with English translation provided by Global Dossier.
International Preliminary Report on Patentability from PCT/CN2016/094334, dated Nov. 14, 2018, with English translation from WIPO.
Written Opinion of the International Searching Authority from

(56) References Cited

OTHER PUBLICATIONS

PCT/CN2016/094334, dated Dec. 301, 2016, with English translation from WIPO.

* cited by examiner

METHOD AND SYSTEM FOR OBTAINING USER'S VISIT INFORMATION, DEVICE AND COMPUTER STORAGE MEDIUM

CROSS-REFERENCE TO RELATED APPLICATIONS

The present disclosure is the U.S. national phase application of PCT Application No. PCT/CN2016/094334 filed on Aug. 10, 2016, which claims priority to the Chinese patent application No. 201610308019.1 entitled "Method and System for Obtaining User's Visit Information" filed on the filing date May 11, 2016, the disclosures of which are incorporated herein by reference in their entireties.

The present disclosure claims priority to the Chinese patent application No. 201610308019.1 entitled "Method and System for Obtaining User's Visit Information" filed on the filing date May 11, 2016, the entire disclosure of which is hereby incorporated by reference in its entirety.

FIELD OF THE DISCLOSURE

The present disclosure relates to the technical field of computer application, and particularly to a method and system for obtaining a user's visit information.

BACKGROUND OF THE DISCLOSURE

As smart terminals such as smart phones, tablet computers and smart wearable devices prevail rapidly, large Internet companies focus attention to development and spread of mobile Internet-based products. Location Based Service (LBS) can provide users with relevant service according to users' geographical locations, and bring about business opportunities to companies while providing convenience to the users' life.

Regarding the LBS, making statistics of the number of users who actually visit becomes a large demand of the service, and is also an important index for evaluating a service and spreading effect. The user's visit information is obtained mainly according to the user's geographic location information. Currently, main positioning technologies include base station positioning, GPS positioning, and wifi positioning. However, the base station positioning accuracy is not high and an indoor effect of the GPS positioning is undesirable, so currently wifi positioning is used most widely.

Currently-employed manners of obtaining the user's visit information are mainly that the user signs in and comments or the user connects wifi deployed by a service provider. However, these manners depend on the user's behaviors to a higher degree. If the user does not perform these behaviors, the user's visit information cannot be obtained.

SUMMARY OF THE DISCLOSURE

In view of the above, the present disclosure provides a method and system for obtaining a user's visit information, to weaken the dependency on the user's behaviors.

Specific technical solutions are as follows:

The present disclosure provides a method for obtaining a user's visit information, the method comprising:

a monitoring device which is arranged within a coverage range of a wireless router monitors a wifi broadcast message;

cracking the monitored wifi broadcast message to obtain a user terminal equipment identification and/or a user identification contained in the message;

uploading the user terminal equipment identification and/or the user identification to a service-end device, so that the service-end device stores a correspondence relationship between the user identification and address information of the monitoring device.

According to a preferred implementation mode of the present disclosure, the monitoring device works in a monitor mode.

According to a preferred implementation mode of the present disclosure, the obtaining a user terminal equipment identification and/or a user identification contained in the message comprises:

according to a pre-configured field position, parsing the cracked wifi broadcast message to obtain the user terminal equipment identification and/or user identification.

According to a preferred implementation mode of the present disclosure, the method further comprises:

if information is not obtained by parsing from the cracked wifi broadcast message according to the pre-configured field position, discarding the wifi broadcast message.

According to a preferred implementation mode of the present disclosure, if the monitoring device uploads the user terminal equipment identification to a service-end device, the service-end device determines the user identification corresponding to the user terminal equipment identification uploaded by the monitoring device, according to a binding relationship between the pre-obtained user terminal equipment identification and user identification; stores a correspondence relationship between the user identification and address information of the monitoring device.

According to a preferred implementation mode of the present disclosure, if the monitoring device uploads the user identification to a service-end device, the service-end device judges whether the user identification belongs to user identifications of the present service system, and if yes, stores the correspondence relationship between the user identification and the address information of the monitoring device; if no, discards the user identification.

According to a preferred implementation mode of the present disclosure, if the monitoring device uploads the user terminal equipment identification and user identification to a service-end device, the service-end device judges whether the user identification belongs to user identifications of the present service system, and if yes, stores the correspondence relationship between the user identification and the address information of the monitoring device, or further stores a binding relationship between the user terminal equipment identification and the user identification; otherwise, discards the user terminal equipment identification and user identification.

The present disclosure provides a system for obtaining a user's visit information, the system comprising:

a monitoring device which is arranged within a coverage range of a wireless router is used to monitor a wifi broadcast message; crack the monitored wifi broadcast message to obtain a user terminal equipment identification and/or a user identification contained in the message; upload the user terminal equipment identification and/or the user identification to a service-end device;

the service-end device stores a correspondence relationship between the user identification and address information of the monitoring device according to information uploaded by the monitoring device.

According to a preferred implementation mode of the present disclosure, the monitoring device works in a monitor mode.

According to a preferred implementation mode of the present disclosure, the monitoring device is specifically configured to:

according to a pre-configured field position, parse the cracked wifi broadcast message to obtain the user terminal equipment identification and/or user identification.

According to a preferred implementation mode of the present disclosure, the monitoring device is further configured to, if information is not obtained by parsing from the cracked wifi broadcast message according to the pre-configured field position, discard the wifi broadcast message.

According to a preferred implementation mode of the present disclosure, if the monitoring device uploads the user terminal equipment identification to a service-end device, the service-end device determines the user identification corresponding to the user terminal equipment identification uploaded by the monitoring device, according to a binding relationship between the pre-obtained user terminal equipment identification and user identification; stores a correspondence relationship between the user identification and address information of the monitoring device.

According to a preferred implementation mode of the present disclosure, if the monitoring device uploads the user identification to a service-end device, the service-end device judges whether the user identification belongs to user identifications of the present service system, and if yes, stores the correspondence relationship between the user identification and the address information of the monitoring device; if no, discards the user identification.

According to a preferred implementation mode of the present disclosure, if the monitoring device uploads the user terminal equipment identification and user identification to a service-end device, the service-end device judges whether the user identification belongs to user identifications of the present service system, and if yes, stores the correspondence relationship between the user identification and the address information of the monitoring device, or further stores a binding relationship between the user terminal equipment identification and the user identification; otherwise, discards the user terminal equipment identification and user identification.

As can be seen from the above technical solutions, the manner provided by the present disclosure is completely senseless for users, and does not affect communication between the user terminal equipment and the wireless router. In this manner, the user's visit information can be collected without the user's extra behaviors, and dependence on the user's behaviors is weakened.

DETAILED DESCRIPTION OF PREFERRED EMBODIMENTS

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "responsive to determining" or "when . . . (stated condition or event) is detected" or "responsive to detecting (stated condition or event)".

Figure 1:
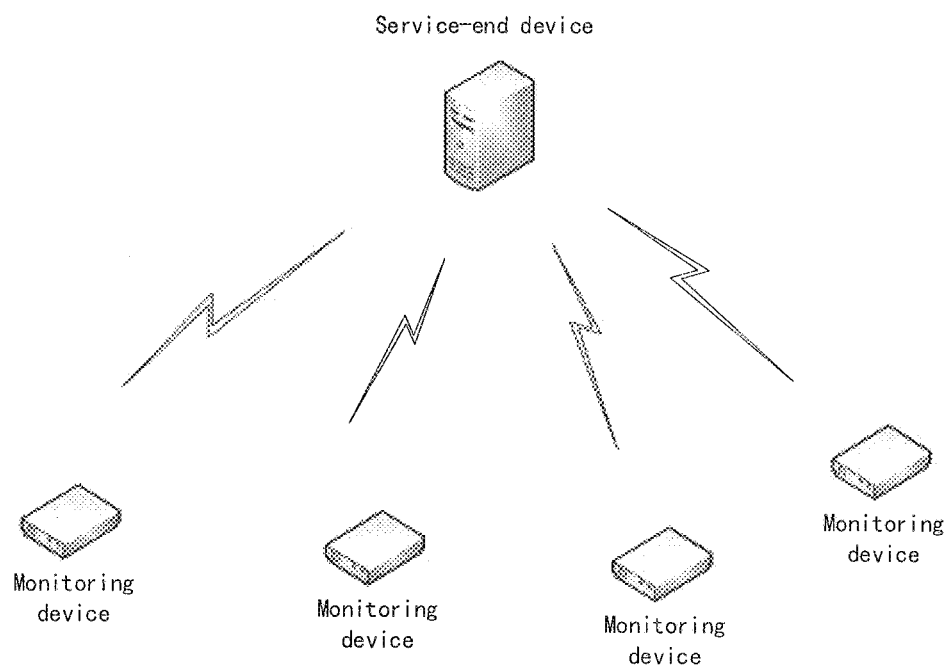
FIG. 1 is a schematic diagram of components of a system according to an embodiment of the present disclosure.
Figure 2:
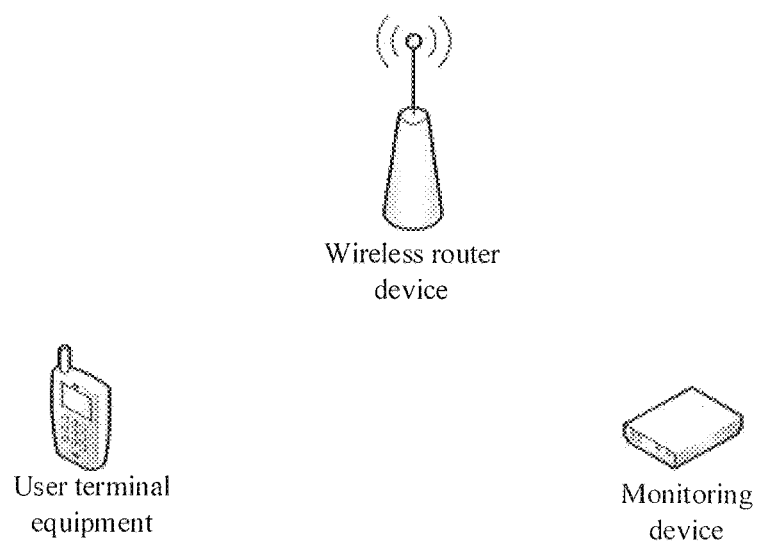
FIG. 2 is a schematic diagram of deploying a monitoring device according to an embodiment of the present disclosure.

FIG. 1 is a schematic diagram of components of a system on which the present disclosure is based. The system mainly comprises monitoring devices and a service-end device. The monitoring device, as shown in FIG. 2, are located within a coverage range of a wireless router. These wireless routers are distributed at respective locations, and may be wireless routers provided by shopping malls, restaurants, hotels, cafes, cinemas, ordinary homes and so on. The present disclosure does not limit providers of the wireless routers. However, the monitoring devices need to be deployed within the coverage ranges of the wireless routers, and location information of the monitoring devices are recorded in the service end in advance.

Main functions of the monitoring devices are as follows:
1) Monitoring the wifi broadcast message.
2) cracking the monitored wifi broadcast message to obtain a user terminal equipment identification and/or a user identification contained in the message.
3) uploading the obtained terminal equipment identification and/or user identification to a service-end device.

Main functions of the service-end device are as follows:
1) receiving information uploaded by the monitoring devices.
2) according to the information uploaded by the monitoring devices, storing a correspondence relationship between the user identification and address information of the monitoring devices. Presence of the correspondence relationship indicates that the user corresponding to the user identification visited the address corresponding to the monitoring device.

The present disclosure will be described in detail below through several embodiments.

Embodiment 1

Figure 3:
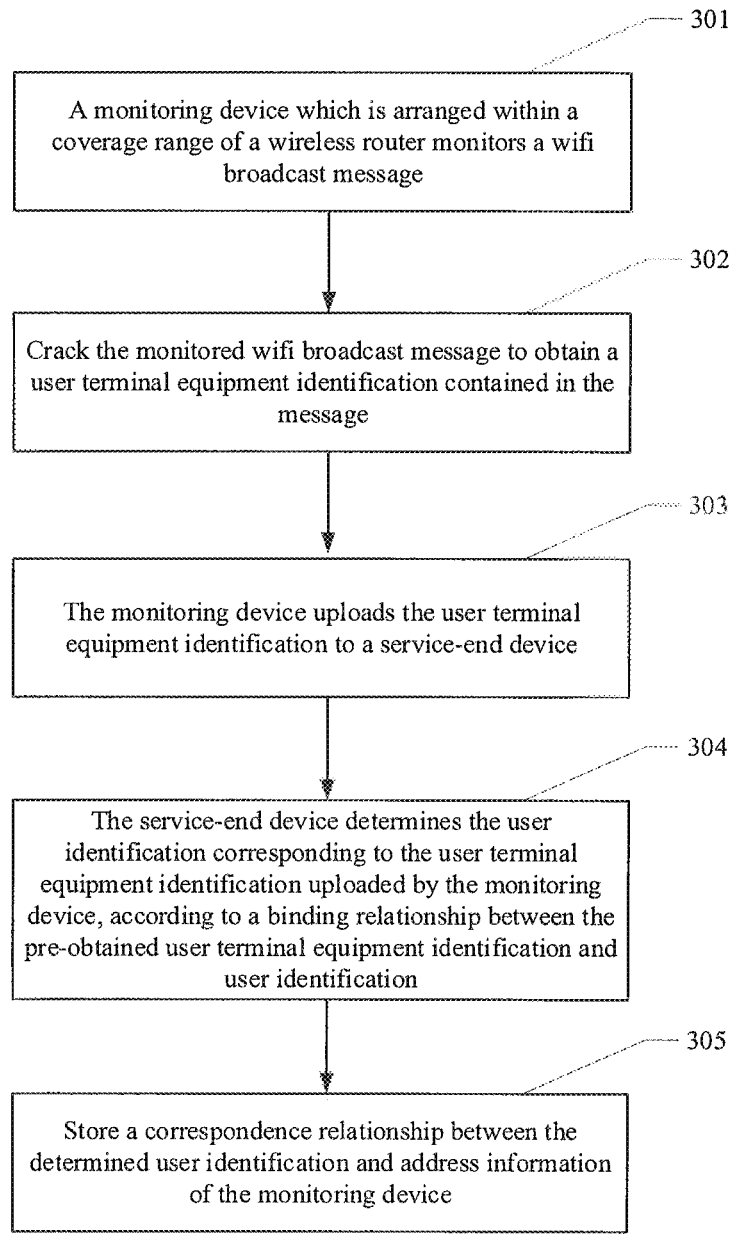
FIG. 3 is a flow chart of a method according to Embodiment 1 of the present disclosure.

FIG. 3 is a main flow chart of a method according to Embodiment 1 of the present disclosure. As shown in FIG. 3, the method may comprise the following steps:

At 301, a monitoring device which is arranged within a coverage range of a wireless router monitors a wifi broadcast message.

To facilitate understanding, firstly, brief introduction is made to several common working modes of a wireless network card: a wireless router device such as an AP (access point) mainly works in a Master mode. Upon working in the Master mode, the wireless router device provides wireless access service and a routing function. The user terminal equipment mainly works in a Managed mode. Upon working in the Managed mode, the user terminal may wirelessly access the Internet. The monitoring devices according to the present disclosure work in a monitoring device manner. Upon working in the monitoring device mode, the monitoring devices may scan an air channel, thereby monitoring and parsing the broadcast message in the air channel (a wifi broadcast message is involved in the embodiment of the present disclosure).

Communication between the router and the user terminal equipment is propagated in the wifi broadcast form on the air channel. The two work in a non-monitoring device mode, filter away message not sent to themselves, and only receive and parse messages sent to themselves. However, monitoring devices working in the monitoring device mode monitoring device all wifi broadcast messages in the air channel. However, user terminal devices working in the monitoring device mode cannot be found by searching and cannot be connected. Therefore, the user terminal devices cannot be sensed and are completely transparent, and cannot affect communication between the user terminal device and the wireless router.

After deployment of monitoring devices is completed, it is possible to record location information of the monitoring devices at the service end. As such, after information related to the user identification and reported by the monitoring devices is received subsequently, the user's location can be acquired, that is, the location of the monitoring device reporting the information related to the user identification.

At 302, crack the monitored wifi broadcast message to obtain a user terminal equipment identification contained in the message.

Since the wifi broadcast message is usually an encrypted message. Encrypting manners include Open, WEP, WPA-PSK, WPA2/PSK and so on. Cracking the broadcast message is decoding and parsing the monitored wifi broadcast message mainly with respect to the encrypting manners. The present disclosure does not limit the manners of cracking the wifi broadcast message, and may employ any current cracking manner, for example, may employ Aircrack software, so long as the cracking of the wifi broadcast message can be implemented.

After the wifi broadcast message is cracked, content of the message is a clear text. Since structures of various types of wifi broadcast messages are not certainly the same, the monitoring devices do not know and needn't know structures of various wifi broadcast messages, and only need to preset a field position including the user terminal equipment identification and extract information from the field position, with respect to the structure of the wifi broadcast message employed when the service provider provides service. For example, when the user terminal equipment uses Baidu's APP to communicate with the service end, the message sent by it employs a structure (format) duly agreed with service end, i.e., the preset field carries corresponding information, and then the wifi broadcast message communicated between the user terminal equipment (when the user uses Baidu's APP) and the wireless router device also employ this structure.

However, the wifi broadcast message sent by the user terminal equipment is not certainly a Baidu-set structure. For example, when the user uses other service providers' APPs, the user terminal equipment sends the wifi broadcast message according to a structure preset by other service providers. Hence, there might be a case that the monitoring device fails to obtain the information by parsing according to the pre-configured field position. In this case, it is feasible to directly discard the wifi broadcast message.

The user terminal equipment identification may employ but not limited to: information such as an MAC address, IMEI and UDID of the user terminal equipment, which can solely identify the user terminal equipment.

At 303, the monitoring device uploads the user terminal equipment identification to the service-end device.

At 304, the service-end device determines the user identification corresponding to the user terminal equipment identification uploaded by the monitoring device, according to a binding relationship between the pre-obtained user terminal equipment identification and user identification.

As far as the service provider is concerned, what it concerns is only users who register for its service, namely, user identifications belonging to its service system. Therefore, it is necessary to, at the service end, convert the user terminal equipment identifications uploaded by the monitoring devices into user identifications belonging to its service system. In embodiments of the present disclosure, the service-end device may obtain the binding relationship between the user terminal equipment identification and user identification in many manners. For example, when the user registers or uses the service provided by the service provider, he may complete the binding between the user terminal equipment identification and user identification upon the service provider's request or initiatively, and upload the binding relationship to the service-end device for storage. For example again, it is also possible to obtain the binding relationship in the manner as stated in Embodiment 3. For particulars, please refer to Embodiment 3. Certainly, other binding manners may also be employed. The binding process is in fact completing ID communication so that IDs of other systems can be converted to the ID of the present service system.

For example, the Baidu's service-end device already pre-obtains and stores the binding relationship between the MAC address of the user terminal equipment and Baidu's user account. After the MAC address of the user terminal equipment uploaded by the monitoring device is received, the corresponding Baidu user account can be determined according to the binding relationship.

At 305, store the determined correspondence relationship between the user identification and the address information of the monitoring device.

This step in fact forms a piece of location record of the user, namely, indicates that the user corresponding to the user identification already visits the address corresponding to the monitoring device. The record may further include other auxiliary information such as time.

It is possible to obtain users' visit information at respective locations in a way that monitoring devices scattered at respective locations report constantly. The whole process is completely senseless for users, and does not depend on the user's behaviors.

Embodiment 2

Figure 4:
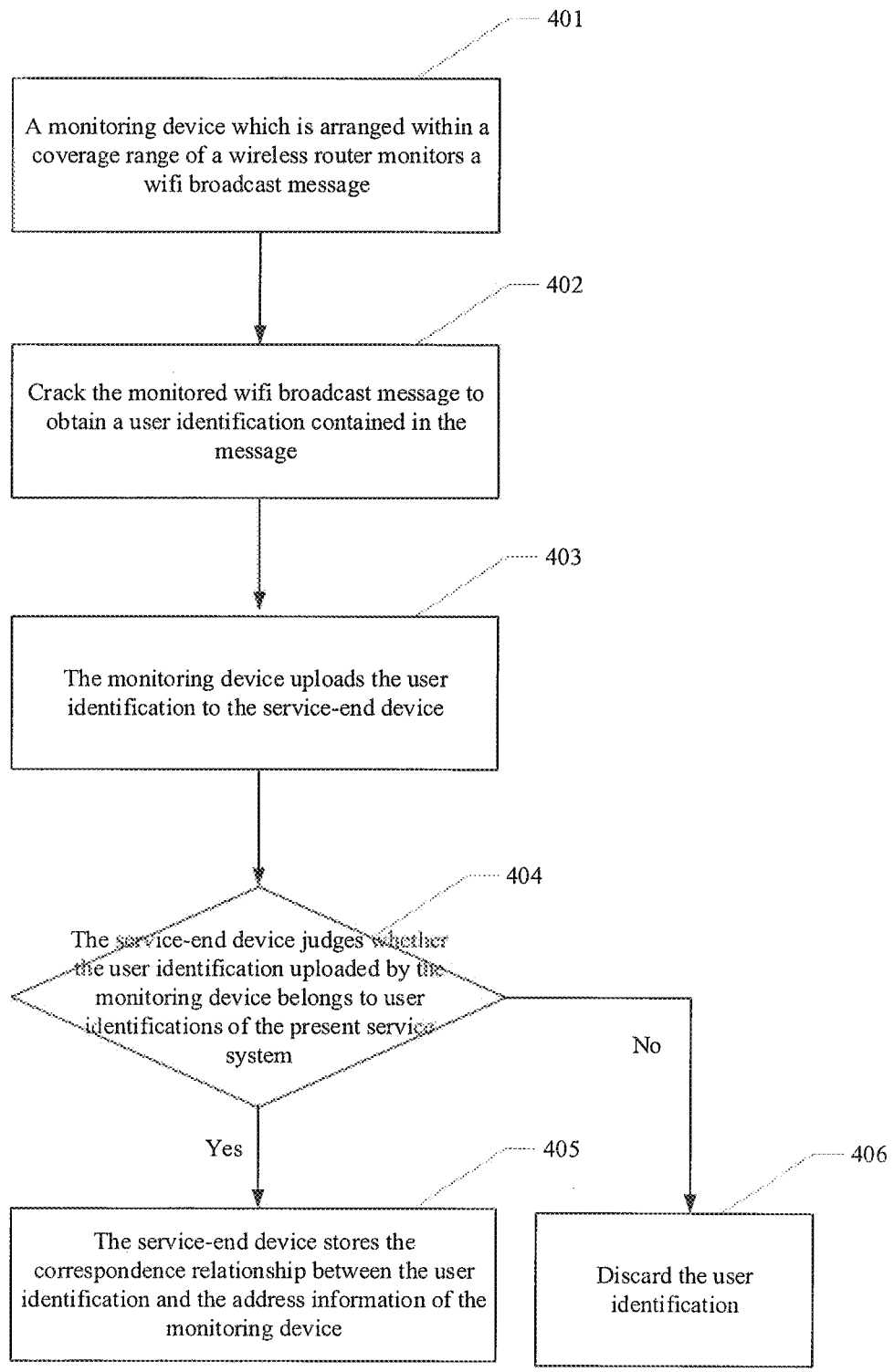
FIG. 4 is a flow chart of a method according to Embodiment 2 of the present disclosure.

FIG. 4 is a main flow chart of a method according to Embodiment 2 of the present disclosure. As shown in FIG. 4, the method may comprise the following steps:

Step 401 is identical with step 301 and will not be detailed any more.

At 402, crack the monitored wifi broadcast message to obtain a user identification contained in the message.

The cracking process is not detailed here any longer. Reference may be made to relevant depictions in Embodiment 1. In the present embodiment, unlike Embodiment 1, the field position pre-configured by the monitoring device is a field position where the user identification lies, so what is obtained and uploaded to the service-end device is the user identification.

Likewise, if the information is not obtained by parsing according to the pre-configured field position, the wifi broadcast message may be directly discarded.

User identifications employed by different service providers may be different manners, and may include but not limited to: information such as an account number, a serial number, a mobile phone number and an E-mail account which can solely identify the user.

At 403, the monitoring device uploads the obtained user identification to the service-end device.

At 404, the service-end device judges whether the user identification uploaded by the monitoring device belongs to user identifications of the present service system, and performs 405 if yes; if no, perform 406, namely, discard the user identification.

Since the field positions employed by different service providers and carrying the user identification may be the same, the user identification obtained by the monitoring device is not certainly of the present service system, and even might not be the user identification, not other information. Therefore, in this step, the service-end device may first judge whether the user identification uploaded by the monitoring device belongs to user identifications of the present service system. A judging manner may include but not limited to: traversing all user identifications of the present service system, and judging whether there is a user identification consistent with the user identification uploaded by the monitoring device; or judging whether the user identification uploaded by the monitoring device complies with a forming rule of the user identifications of the present service system.

At 405, the service-end device stores the correspondence relationship between the user identification and the address information of the monitoring device.

Embodiment 3

Figure 5:
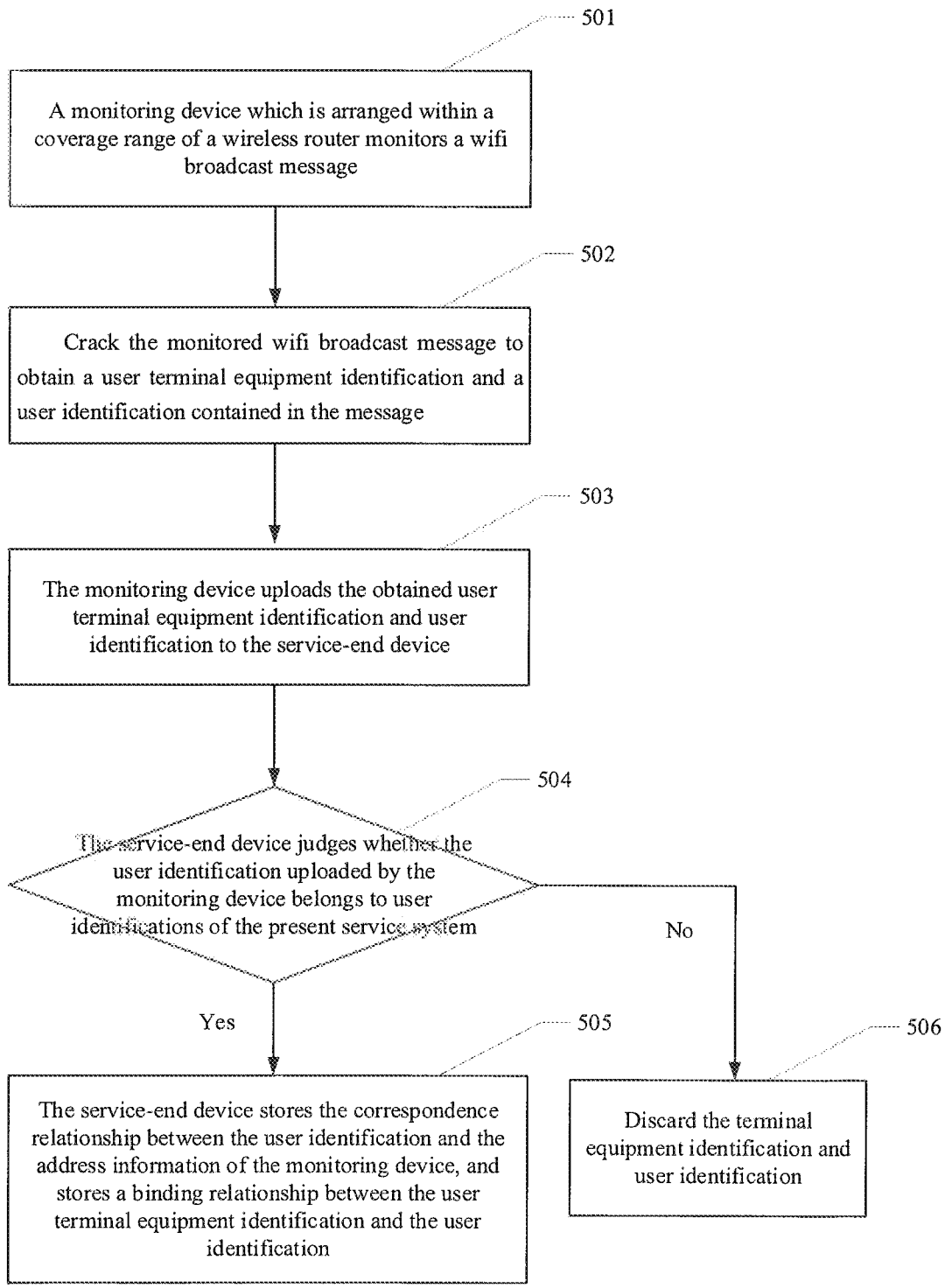
FIG. 5 is a flow chart of a method according to Embodiment 3 of the present disclosure.

FIG. 5 is a main flow chart of a method according to Embodiment 3 of the present disclosure. As shown in FIG. 5, the method may comprise the following steps:

Step 501 is identical with step 301 and will not be detailed any more.

At 502, crack the monitored wifi broadcast message to obtain a user terminal equipment identification and a user identification contained in the message.

In the present embodiment, unlike the above two embodiments, there exist two field positions pre-configured by the monitoring device: a field position where the user terminal equipment identification lies and a field position where the user identification lies. Therefore, what is obtained and uploaded to the service-end device is the user terminal equipment identification and the user identification.

Likewise, so long as information is not parsed from one field position according to the pre-configured field position, the wifi broadcast message is not the message of the present service system, and the wifi broadcast message may be directly discarded.

At 503, the monitoring device uploads the obtained user terminal equipment identification and user identification to the service-end device.

At 504, the service-end device judges whether the user identification uploaded by the monitoring device belongs to user identifications of the present service system, and performs 505 if yes; if no, perform 506, namely, discard the terminal equipment identification and user identification.

The present step is similar to step 404 in Embodiment 2 and will not be detailed any more here.

At 505, the service-end device stores the correspondence relationship between the user identification and the address information of the monitoring device, and stores a binding relationship between the user terminal equipment identification and the user identification.

In this step, there is formed a piece of location record of the user, namely, indicating that the user corresponding to the user identification already visits the address corresponding to the monitoring device. In addition, since the monitoring device reports the user terminal equipment identification and user identification simultaneously, this indicates that a binding relationship exists between the user identification and the user terminal equipment identification, so the binding relationship may be stored locally. If the binding relationship between the user identification and other user terminal equipment identification is already stored locally, the user terminal equipment identification and user identification received latest are used to update the already-existing binding relationship.

It needs to be appreciated that the user terminal involved in the embodiments of the present disclosure comprises but is not limited to smart mobile terminals such as a smart mobile phone, a tablet computer, a notebook computer and a Personal Digital Assistant (PDA), and wearable devices such as a smart watch, smart glasses, and smart bracelets.

In the embodiments provided by the present disclosure, it should be understood that the revealed system and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

What are stated above are only preferred embodiments of the present disclosure, not intended to limit the disclosure. Any modifications, equivalent replacements, improvements and the like made within the spirit and principles of the present disclosure, should all be included in the present disclosure within the scope of protection.

What is claimed is:

1. A method for obtaining a user's visit information, wherein the method comprises:
   monitoring a wifi broadcast message by a monitoring device which is arranged within a coverage range of a wireless router;
   cracking the monitored wifi broadcast message to obtain a user terminal equipment identification and/or a user identification contained in the message;
   uploading the user terminal equipment identification and/or the user identification to a service-end device, so that the service-end device stores a correspondence relationship between the user identification and address information of the monitoring device, and
   wherein the monitoring device works in a monitor mode in which an air channel is scanned to monitor and parse the wifi broadcast message in the air channel, and the monitoring device working in the monitor mode cannot be found by searching and cannot be connected by the user terminal equipment so that the communication between the user terminal equipment and the wireless router is not affected.

2. The method according to claim 1, wherein the obtaining a user terminal equipment identification and/or a user identification contained in the message comprises:
   according to a pre-configured field position, parsing the cracked wife broadcast message to obtain the user terminal equipment identification and/or user identification.

3. The method according to claim 2, wherein the method further comprises:
   if information is not obtained by parsing from the cracked wifi broadcast message according to the pre-configured field position, discarding the wifi broadcast message.

4. The method according to claim 1, wherein if the monitoring device uploads the user terminal equipment identification to a service-end device, the service-end device determines the user identification corresponding to the user terminal equipment identification uploaded by the monitoring device, according to a binding relationship between the pre-obtained user terminal equipment identification and user identification; stores a correspondence relationship between the user identification and address information of the monitoring device.

5. The method according to claim 1, wherein if the monitoring device uploads the user identification to a service-end device, the service-end device judges whether the user identification belongs to user identifications of the present service system, and if yes, stores the correspondence relationship between the user identification and the address information of the monitoring device; if no, discards the user identification.

6. The method according to claim 1, wherein if the monitoring device uploads the user terminal equipment identification and user identification to a service-end device, the service-end device judges whether the user identification belongs to user identifications of the present service system, and if yes, stores the correspondence relationship between the user identification and the address information of the monitoring device, or further stores a binding relationship between the user terminal equipment identification and the user identification; otherwise, discards the user terminal equipment identification and user identification.

7. A device, wherein the device comprises:
   one or more processors,
   a memory,
   one or more programs which are stored in the memory and, when executed by said one or more processors, perform a method for obtaining a user's visit information, wherein the method comprises:
   monitoring a wifi broadcast message, the monitoring device being arranged within a coverage range of a wireless router;
   cracking the monitored wifi broadcast message to obtain a user terminal equipment identification and/or a user identification contained in the message;
   uploading the user terminal equipment identification and/or the user identification to a service-end device, so that the service-end device stores a correspondence relationship between the user identification and address information of the monitoring device, and
   wherein the monitoring device works in a monitor mode in which an air channel is scanned to monitor and parse the wifi broadcast message in the air channel, and the monitoring device working in the monitor mode cannot be found by searching and cannot be connected by the user terminal equipment so that the communication between the user terminal equipment and the wireless router is not affected.

8. The device according to claim 7, wherein the obtaining a user terminal equipment identification and/or a user identification contained in the message comprises:
   according to a pre-configured field position, parsing the cracked wifi broadcast message to obtain the user terminal equipment identification and/or user identification.

9. The device according to claim 8, wherein the method further comprises:
   if information is not obtained by parsing from the cracked wifi broadcast message according to the pre-configured field position, discarding the wifi broadcast message.

10. The device according to claim 7, wherein if the monitoring device uploads the user terminal equipment identification to a service-end device, the service-end device determines the user identification corresponding to the user terminal equipment identification uploaded by the monitoring device, according to a binding relationship between the pre-obtained user terminal equipment identification and user identification; stores a correspondence relationship between the user identification and address information of the monitoring device.

11. The device according to claim 7, wherein if the monitoring device uploads the user identification to a service-end device, the service-end device judges whether the user identification belongs to user identifications of the present service system, and if yes, stores the correspondence relationship between the user identification and the address information of the monitoring device; if no, discards the user identification.

12. The device according to claim 7, wherein if the monitoring device uploads the user terminal equipment identification and user identification to a service-end device, the service-end device judges whether the user identification belongs to user identifications of the present service system, and if yes, stores the correspondence relationship between the user identification and the address information of the monitoring device, or further stores a binding relationship between the user terminal equipment identification and the user identification; otherwise, discards the user terminal equipment identification and user identification.

13. A non-transitory computer storage medium which is encoded with a computer program, the program, when executed by one or more computers, enabling said one or more computers to perform a method for obtaining a user's visit information, wherein the method comprises:

monitoring a wifi broadcast message by a monitoring device which is arranged within a coverage range of a wireless router;

cracking the monitored wifi broadcast message to obtain a user terminal equipment identification and/or a user identification contained in the message;

uploading the user terminal equipment identification and/or the user identification to a service-end device, so that the service-end device stores a correspondence relationship between the user identification and address information of the monitoring device, and wherein the monitoring device works in a monitor mode in which an air channel is scanned to monitor and parse the wifi broadcast message in the air channel, and the monitoring device working in the monitor mode cannot be found by searching and cannot be connected by the user terminal equipment so that the communication between the user terminal equipment and the wireless router is not affected.

14. The non-transitory computer storage medium according to claim 13, wherein the obtaining a user terminal equipment identification and/or a user identification contained in the message comprises:

according to a pre-configured field position, parsing the cracked wifi broadcast message to obtain the user terminal equipment identification and/or user identification.

15. The non-transitory computer storage medium according to claim 14, wherein the method further comprises:

if information is not obtained by parsing from the cracked wifi broadcast message according to the pre-configured field position, discarding the wifi broadcast message.

16. The non-transitory computer storage medium according to claim 13, wherein if the monitoring device uploads the user terminal equipment identification to a service-end device, the service-end device determines the user identification corresponding to the user terminal equipment identification uploaded by the monitoring device, according to a binding relationship between the pre-obtained user terminal equipment identification and user identification; stores a correspondence relationship between the user identification and address information of the monitoring device.

17. The non-transitory computer storage medium according to claim 13, wherein if the monitoring device uploads the user identification to a service-end device, the service-end device judges whether the user identification belongs to user identifications of the present service system, and if yes, stores the correspondence relationship between the user identification and the address information of the monitoring device; if no, discards the user identification.

* * * * *